(12) United States Patent
Krishnaswamy et al.

(10) Patent No.: US 9,923,860 B2
(45) Date of Patent: Mar. 20, 2018

(54) ANNOTATING CONTENT WITH CONTEXTUALLY RELEVANT COMMENTS

(71) Applicant: International Business Machines Corporation, Armonk, NY (US)

(72) Inventors: Dilip Krishnaswamy, Bangalore (IN); Abhishek Shivkumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 14/811,982

(22) Filed: Jul. 29, 2015

(65) Prior Publication Data

US 2017/0034107 A1    Feb. 2, 2017

(51) Int. Cl.
| | |
|---|---|
| H04L 12/58 | (2006.01) |
| G06F 17/27 | (2006.01) |
| G06F 17/28 | (2006.01) |
| G06F 17/24 | (2006.01) |
| G06F 7/08 | (2006.01) |

(52) U.S. Cl.
CPC ............... H04L 51/32 (2013.01); G06F 7/08 (2013.01); G06F 17/241 (2013.01); G06F 17/2785 (2013.01); G06F 17/289 (2013.01)

(58) Field of Classification Search
CPC ........ H04L 51/32; G06Q 50/01; G06F 3/0482
USPC .................... 709/204, 206; 706/52
See application file for complete search history.

(56) References Cited

U.S. PATENT DOCUMENTS

| | | | | |
|---|---|---|---|---|
| 5,822,539 | A * | 10/1998 | van Hoff | ........... G06F 17/30899 707/E17.119 |
| 8,115,869 | B2 | 2/2012 | Rathod et al. | |
| 8,407,665 | B1 | 3/2013 | Eddings et al. | |
| 8,719,713 | B2 | 5/2014 | Esposito et al. | |
| 8,732,783 | B2 | 5/2014 | Kwak et al. | |
| 8,954,316 | B2 * | 2/2015 | Revesz | ............. G06F 17/30707 704/9 |
| 8,977,685 | B2 * | 3/2015 | Kanter | ................... G06Q 50/01 709/204 |
| 9,176,933 | B2 * | 11/2015 | Kotler | ..................... G06F 17/21 |
| 9,348,921 | B2 * | 5/2016 | Collins | .................. G06Q 50/01 |

(Continued)

FOREIGN PATENT DOCUMENTS

WO    2014048479 A1    4/2014

OTHER PUBLICATIONS

Brennan M, Wrazien S, Greenstadt R. Using machine learning to augment collaborative filtering of community discussions. InProceedings of the 9th International Conference on Autonomous Agents and Multiagent Systems: vol. 1-vol. 1 May 10, 2010 (pp. 1569-1570). International Foundation for Autonomous Agents and Multiagent Systems.*

(Continued)

*Primary Examiner* — Ranodhi Serrao
*Assistant Examiner* — James Fiorillo
(74) *Attorney, Agent, or Firm* — David Zwick

(57) ABSTRACT

Automatically augmenting online content with contextually relevant comments. Online content and associated comments are received. The comments are classified as chit-chat or informative. For each informative comment, a portion of the online content to which the comment is most relevant is determined, and the comment is associated with a position in the online content that corresponds to the determined portion of the online content. A subset of the informative comments is selected for presentation.

17 Claims, 7 Drawing Sheets

(56) References Cited

U.S. PATENT DOCUMENTS

| | | | | |
|---|---|---|---|---|
| 9,519,525 | B2* | 12/2016 | Carriero | G06F 17/3089 |
| 2008/0154883 | A1* | 6/2008 | Chowdhury | G06F 17/2745 |
| 2009/0248516 | A1* | 10/2009 | Gross | G06F 17/30899 |
| | | | | 705/14.66 |
| 2011/0189646 | A1* | 8/2011 | Benninga | G09B 5/00 |
| | | | | 434/350 |
| 2011/0302124 | A1 | 12/2011 | Cai et al. | |
| 2012/0036210 | A1* | 2/2012 | Balajee | G06Q 10/06 |
| | | | | 709/206 |
| 2012/0131112 | A1* | 5/2012 | Yehaskel | G06F 17/30864 |
| | | | | 709/206 |
| 2013/0138735 | A1* | 5/2013 | Kanter | G06Q 50/01 |
| | | | | 709/204 |
| 2013/0191762 | A1* | 7/2013 | Rajagopalan | H04L 12/1818 |
| | | | | 715/753 |
| 2013/0297691 | A1* | 11/2013 | Collins | G06F 17/30867 |
| | | | | 709/204 |
| 2014/0012910 | A1 | 1/2014 | White | |
| 2014/0201126 | A1* | 7/2014 | Zadeh | G06N 7/005 |
| | | | | 706/52 |
| 2014/0337126 | A1 | 11/2014 | Ohanyan et al. | |
| 2015/0135097 | A1* | 5/2015 | Carriero | G06F 17/3089 |
| | | | | 715/753 |
| 2017/0017638 | A1* | 1/2017 | Satyavarta | G06F 17/278 |
| 2017/0098283 | A1* | 4/2017 | Rajan | G06Q 50/01 |
| 2017/0105051 | A1* | 4/2017 | Deo | H04N 21/812 |
| 2017/0140051 | A1* | 5/2017 | Ball | H04L 51/32 |

OTHER PUBLICATIONS

Haslhofer B, Momeni E, Gay M, Simon R. Augmenting Europeana content with linked data resources. InProceedings of the 6th International Conference on Semantic Systems Sep. 1, 2010 (p. 40). ACM.*

Serbanoiu et al., "Relevance-Based Ranking of Video Comments on YouTube," 19th International Conference on Control Systems and Computer Science, 2013, IEEE, pp. 225-231.

Constine, "Facebook's New Comments Box Plugin Filters Website Comment Reels by Relevance," Adweek.com, Social Times, http://www.adweek.com/socialtimes/comments-box-plugin-relevance/258060, Accessed on Apr. 3, 2015, pp. 1-10.

Statsoft, Inc., "Text Mining YouTube: Analyzing Comments with STATISTICA," YouTube.com, Dec. 6, 2012, https://www.youtube.com/watch?v=EQ-xoKTbx34, pp. 1-2.

Sureka, "Mining User Comment Activity for Detecting Forum Spammers in YouTube," arXiv.org, Computer Science; Information Retrieval, Mar. 25, 2011, http://arxiv.org/abs/1103.5044, pp. 1-2.

Ammari et al., "Semantically Enriched Machine Learning Approach to Filter YouTube Comments for Socially Augmented User Models," CiteSeerX, In Proceedings of Workshop on Augmented User Models at the 19th International Conference on User Modeling, Adaptation and Personalisation, 2011, pp. 1-12.

Yau et al., IBM Cognos 10: The product vision, YouTube.com, IBM Business Analytics, Oct. 25, 2010, https://www.youtube.com/watch?v=p0aXB57GL4k, pp. 1-2.

Steele, "ComScore: Most people in the US don't download apps on a regular basis," Aug. 22, 2014, http://www.engadget.com/2014/08/22/comscore-app-downloads/, pp. 1-3.

CMU Sphinx, "Virtual Assistants in Games," Open Source Speech Recognition Toolkit, A Project by Carnegie Mellon University, http://cmusphinx.sourceforge.net/, Mar. 28, 2015, pp. 1-4.

Mell et al., "The NIST Definition of Cloud Computing," National Institute of Standards and Technology, U.S. Department of Commerce, Special Publication 800-145, Sep. 2011, pp. 1-7.

* cited by examiner

US 9,923,860 B2

ANNOTATING CONTENT WITH CONTEXTUALLY RELEVANT COMMENTS

BACKGROUND

The present invention relates generally to the field of presentation processing of online content, and more particularly to annotating online content.

Online content, or web content, refers to textual, visual, or aural content that may be encountered as part of the user experience on web sites. It may include text, images, audio and video files, and animations. In many cases, online content may be augmented with user comments. Comments are typically viewed in a separate comments section of the web page below or to the side of the online content. In some cases, a comment may express a critique or other form of feedback that relates to a specific portion of the content, or it may provide additional information relevant to a specific portion of the content. An example is timed comments, which are anchored by individual commenters to specific moments in a video or audio recording.

Comments can be of various types, including unimportant chit-chat and comments that support or are critical of the online content. Many comments are simply spam, including disruptive or commercial messages, or constitute trolling, i.e., are deliberately inflammatory or provocative.

SUMMARY

Embodiments of the present invention disclose a computer-implemented method, computer program product, and system for augmenting online content with contextually relevant comments. Online content and associated comments are received. The comments are classified as chit-chat or informative. For each informative comment, a portion of the online content to which the comment is most relevant is determined, and the comment is associated with a position in the online content that corresponds to the determined portion of the online content. A subset of the informative comments is selected for presentation.

DETAILED DESCRIPTION

Figure 1:
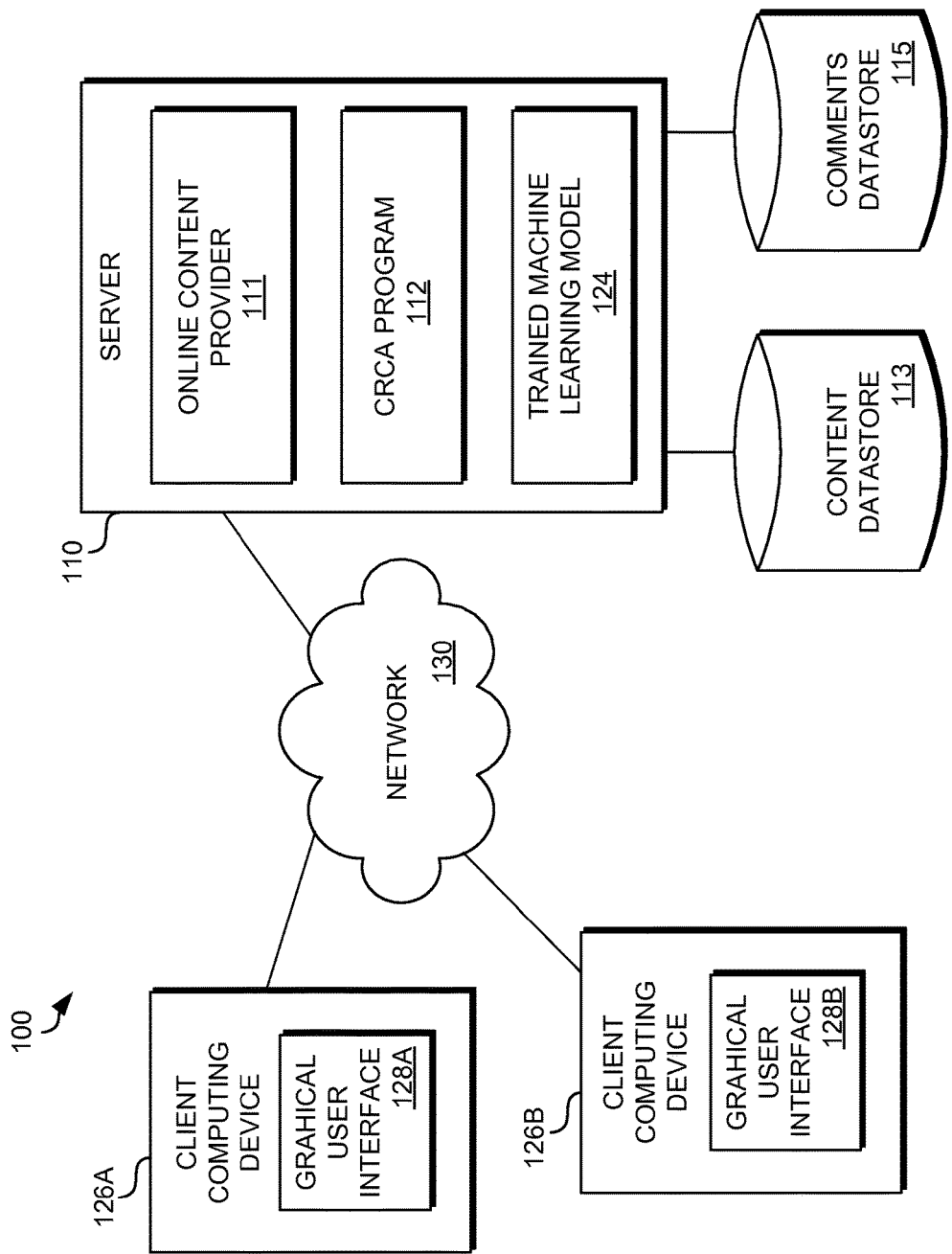
FIG. 1 is a functional block diagram of a contextually relevant content annotation (CRCA) system, in accordance with an embodiment of the present invention.

Embodiments of the present invention are directed to contextually relevant content annotation (CRCA) systems, which annotate, or augment, online content with comments relevant to a particular portion of the online content, i.e., contextually relevant comments, and present selected comments to viewers of the online content. In an exemplary embodiment, comments associated with the online content may be classified as chit-chat, e.g., meaningless, unhelpful, or unimportant; or as containing valuable information, i.e., informative. Informative comments may be associated with portions of the online content, for example, sentences or time intervals, to which they are most relevant. A subset of the informative comments, tailored to the current viewer, may then be selected for presentation. In this manner, viewers of the online content may benefit by being able to consume information of particular interest present in the comments at a suitable time or location in the online content.

Machine learning is a field of computer science and statistics that explores the construction and study of algorithms that can learn from data. Such algorithms operate by building a model based on labeled inputs and using the model to make predictions or decisions, rather than only following explicitly programmed instructions. Classification is a machine learning task in which inputs are assigned to, or labeled as belonging to, two or more classes. Common applications of classification include spam filtering and optical character recognition.

In supervised machine learning, a classification function may be inferred, or trained, from a set of labeled training data. The training data consists of training examples, typically pairs of input objects and desired output objects, for example class labels. During training, the parameters of the model are adjusted, usually iteratively, so that inputs are assigned to one or more of the classes to some degree of accuracy, based on a predefined metric. The inferred classification function can then be used to categorize new examples. For example, in sentiment analysis a supervised machine learning model may be trained, using reviews from online review datasets, to distinguish positive reviews from negative or neutral reviews, to a high degree of accuracy. An example of a supervised machine learning model often used for classification is the support vector machine (SVM).

Data mining, another field of computer science, is the computational process of discovering patterns in large data sets, and typically involves methods from the fields of artificial intelligence, machine learning, statistics, and database systems. The goal of data mining is to extract information from a large amount of data and to transform it into a useful structure. Text mining refers to the process of deriving high-quality information from text through means such as machine learning. High quality in text mining usually refers to some combination of relevance, novelty, and interestingness in a particular context. Typical text mining tasks include text categorization and sentiment analysis.

A mind map is a data structure in the form of a hierarchical tree, representing knowledge or a knowledge state, or a combination of hierarchical trees of knowledge, associated, for example, with content received by a user, where each node of the tree represents a topic or body of knowledge, and the edges between the nodes may reflect a correlation associated with knowledge across nodes, a time dependency of information being presented, or both. Each node in the tree that represents a topic or body of knowledge may have a set of keywords or a tree of knowledge embedded in that node, so that the mind map representation may be hierarchical and multi-dimensional, with knowledge trees nested within knowledge trees. Keywords associated with a node in a tree may be used to represent information relative to that node. As content is progressively received by the user, the associated mind map grows in scope and time. Data mining techniques are often used to extract the keywords, topics, or concepts stored in a mind map. Examples of software that may create a mind map data structure include FreeMind (v1.0.0), an open source mind mapping application licensed under the GNU General Public License, and the commercial mind mapping package XMind 6 Pro (v3.5.3), available from XMind, Ltd. All trademarks and registered trademarks used herein are the property of their respective owners.

FIG. 1 is a functional block diagram of a CRCA system 100, in accordance with an embodiment of the present invention. CRCA system 100 includes server 110 and client computing devices 126, all interconnected over a network 130.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and client computing devices 126, in accordance with embodiments of the invention.

In an exemplary embodiment, client computing devices 126 represent user devices that interact with online content that may be received from online content provider 111 on server 110. Client computing devices 126 may include graphical user interfaces 128, by which a user may access online content and enter comments. In various embodiments, graphical user interfaces 128 may be, for example, web browsers that receive web pages provided by online content provider 111 and transmitted by server 110, or web applications that interface with online content provider 111 on server 110.

In various embodiments of the invention, a client computing device 126 may be, for example, a laptop computer, tablet computer, netbook computer, personal computer (PC), a desktop computer, a personal digital assistant (PDA), or a smart phone. In general, a client computing device 126 may be any programmable electronic device capable of communicating with server 110 via network 130, and of supporting functionality as required by one or more embodiments of the invention. A client computing device 126 may include internal and external hardware components as depicted and described in further detail below with reference to FIG. 4.

Server 110 represents a computing environment or platform that hosts online content provider 111, CRCA program 112, and trained machine learning model 124. In various embodiments, server 110 may be a laptop computer, netbook computer, personal computer (PC), a desktop computer, or any programmable electronic device capable of hosting CRCA program 112 and online content provider 111, described below, and communicating with client computing devices 126 via network 130, in accordance with embodiments of the invention. Server 110 may include internal and external hardware components, as depicted and described in further detail below with reference to FIG. 4. In various embodiments, client computing device 126 and server 110 may be one and the same. In other embodiments, server 110 may be implemented in a cloud computing environment, as described in relation to FIGS. 5, 6, and 7, below.

In an exemplary embodiment of the invention, server 110 includes online content provider 111, CRCA program 112, content datastore 113, comments datastore 115, and trained machine learning model 124.

Online content provider 111 represents a source of online content, for example a website or web application that distributes online content, such as blogs, social media, videos, music, or other files. The online content is generally made accessible to users, who may enter comments pertaining to the online content, which are then also made accessible to users. Online content provider 111 may store online content in content datastore 113, and may store comments entered by users pertaining to the online content in comments datastore 115. Online content provider 111 may interact with CRCA program 112 in order to present contextually relevant comments to viewers of the online content, in accordance with an embodiment of the present invention.

Figure 4:
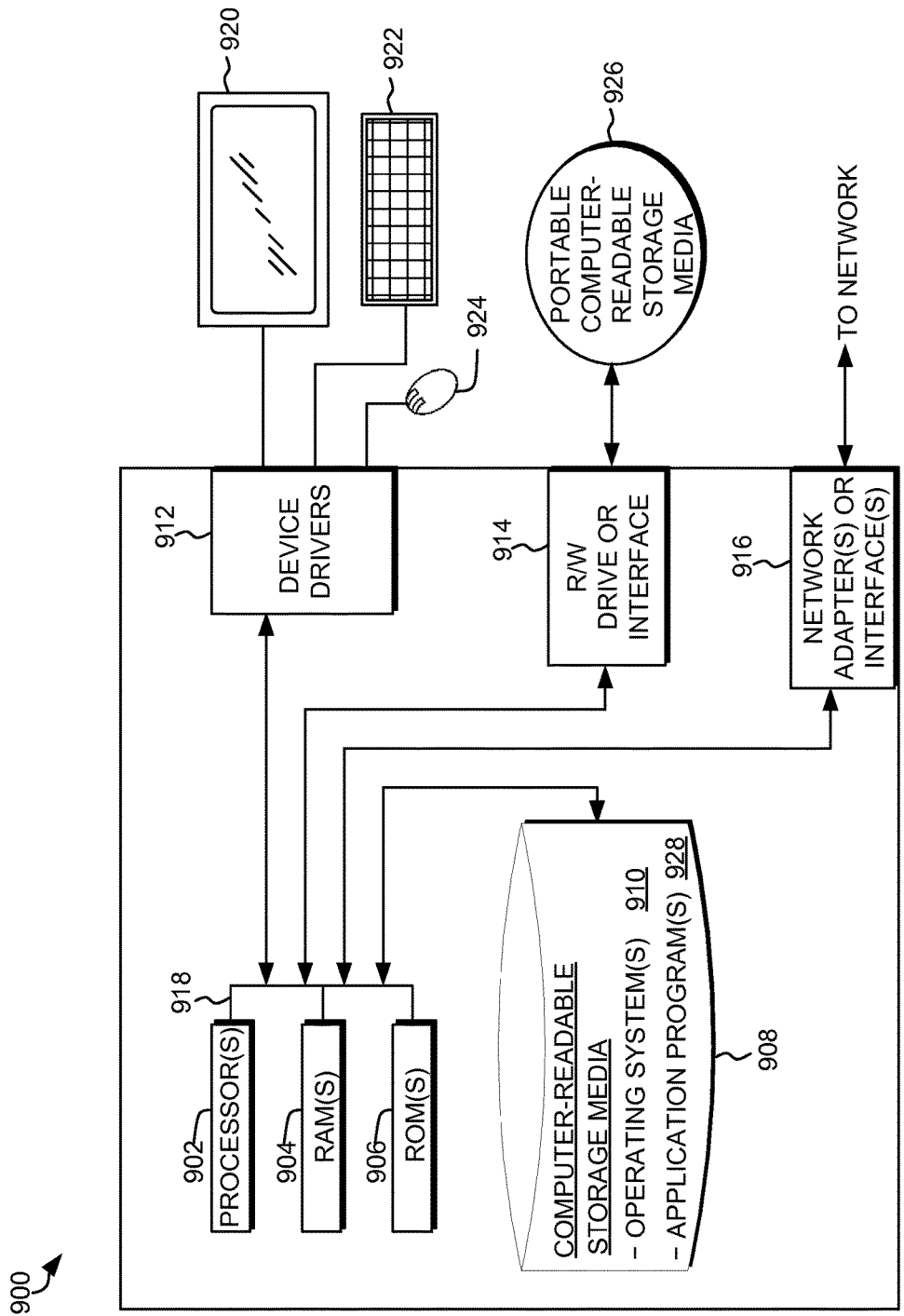
FIG. 4 is a functional block diagram illustrating a data processing environment, in accordance with an embodiment of the present invention.

Content datastore 113 represents a store of online content that may be accessed by CRCA program 112 and/or online content provider 111, in accordance with an embodiment of the invention. Online content may be, for example, videos or sound recordings, podcasts, or news articles provided by online content provider 111. CRCA program 112 may store online content received from online content provider 111 in content datastore 113 for further processing. Content datastore 113 may also be used to store and access processed versions of the online content received from online content provider 111, for example, transcripts of videos produced by a speech to text converter. Content datastore 113 may reside, for example, on computer readable storage media 908 (FIG. 4).

Comments datastore 115 represents a store of comments associated with online content, that may be accessed by CRCA program 112, in accordance with an embodiment of the invention. A body of comments, for example, related to a particular video, may be received in conjunction with the video from online content provider 111 and be stored for further processing in text or binary form in comments datastore 115. Comments datastore 115 may also be used to store cross-reference information between the online content and the associated body of comments. For example, for timed comments, comments datastore 115 may be used to store a list or table linking each comment to a particular timecode in a recording. Comments datastore 115 may reside, for example, on computer readable storage media 908 (FIG. 4).

In an embodiment of the invention, trained machine learning model 124 may be trained to apply a binary classification algorithm, in which comments are classified into two groups, corresponding to the labels "chit-chat" and "informative." Trained machine learning model 124 may use, for example, supervised learning with labeled data from datasets available on the web, consisting of comments paired with labels that identify them as either chit-chat or informative. For example, trained machine learning model 124 may be trained to apply a binary classifier such as SVM or logistic regression.

In other embodiments of the invention, trained machine learning model 124 may be trained to apply an algorithm that classifies comments into more than two groups, for example, "chit-chat," "opinion" and "background." Trained machine learning model 124 may use, for example, supervised learning with labeled data from datasets available on the web, consisting of comments paired with labels that identify them as belonging to these classes. For example, trained machine learning model 124 may be trained to apply a classifier such as neural networks or naïve Bayes.

Figure 2:
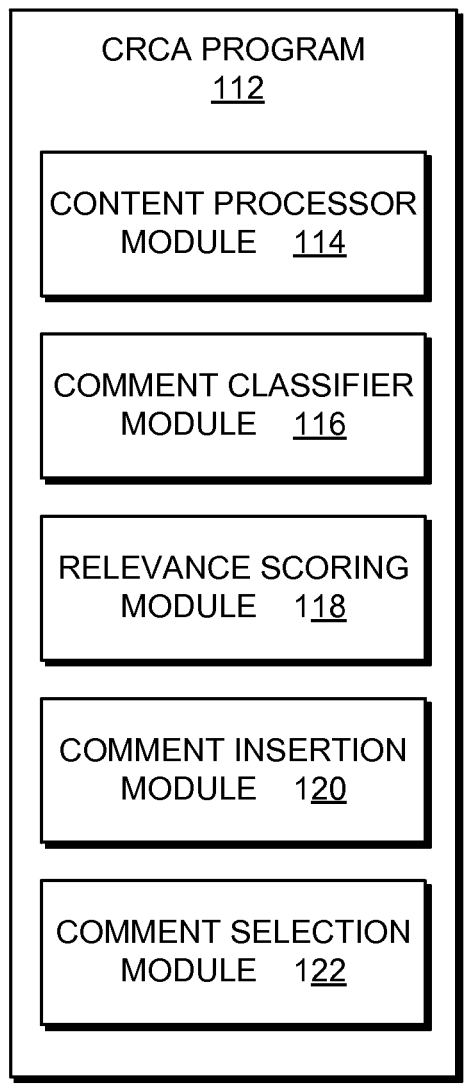
FIG. 2 is a functional block diagram of a CRCA program, in accordance with an embodiment of the present invention.

FIG. 2 depicts a functional block diagram of a CRCA program 112, in accordance with an embodiment of the invention. CRCA program 112 receives online content from online content provider 111, along with an associated body of user comments. Informative comments among the user comments are identified, and the online content is augmented with a selection of the informative comments at positions in the online content where they are determined by the CRCA program to be most relevant. CRCA program 112 may include content processor module 114, comment classifier module 116, relevance scoring module 118, comment insertion module 120, and comment selection module 122.

Content processor module 114 operates generally to convert online content to, for example, a text form suitable for processing by the other modules of CRCA program 112. Here, the text is referred to as contextual text. For example, content processor module 114 may use a speech to text converter, for example any of a number of suitable open source or commercial speech to text conversion tools, to create a timestamped transcription of the speech in video or audio content. If the online content is already textual, content processor module 114 may, in lieu of timestamping, generate a version tagged with location markers, for example, at the start of each sentence or paragraph, or at the start of each group of a predefined number of words. Content processor module 114 may generate a table of cross-references between tags or timestamps in the contextual text and timecodes in the video or audio content. Content processor module 114 may store the tagged or timestamped contextual text, along with cross-reference information, in content datastore 113.

Comment classifier module 116 operates generally to use trained machine learning model 124, which has been previously trained with categorized comments, to classify comments in comments datastore 115 as either chit-chat, for example "cool!" or "this rocks!"; or informative, i.e., containing valuable information, such as critiques or references to related material.

Relevance scoring module 118 operates generally to receive informative comments in comments datastore 115 and contextual text in content datastore 113 and, for each informative comment, locate a section of the contextual text to which the comment is most relevant, in accordance with an embodiment of the invention. For example, relevance scoring module 118 may assign scores to consecutive segments of the contextual text, indicating the relevance of the comment to each segment. The segments may, for example, correspond to text in a window of size of N sentences, with N between three and five. As the window advances from one sentence to the next, capturing different contexts, relevance scoring module 118 may determine a comment relevance score for the portion of the contextual text contained in the window. Relevance scoring module 118 may store the comment ID, and the relevance score and associated content position of the portion of the contextual text having the highest relevance score, in comments datastore 115, for subsequent use by comment insertion module 120, described below.

Several methods may be used to assign relevance scores. For example, an inference could be made on the number of words that match between the N-sentence window, mentioned above, and a comment, with matching words that represent nouns given a higher weight. Based on this, a match indicator could be computed. Alternatively, an inference could be made based words and phrases in a comment and semantically related words and phrases in an N-sentence window. For example, a natural language parsing program such as the Stanford Parser, version 3.5.1, available from The Stanford Natural Language Processing Group at Stanford University, or other proprietary and/or open source natural language parsers, may be used to identify words and phrases that are the subject or object of a verb. Further natural language processing techniques may be used to analyze the identified words and phrases and find additional, semantically related keywords and topics in a lexical database such as WordNet, which may identify synonyms, or a knowledge base such as ConceptNet, which may identify terms related by meaning. A binary-valued relevance score could be used, such that when the match indicator exceeds a threshold value, then the relevance could be labeled as high; otherwise the relevance could be labeled as low. Alternatively, the relevance score could be placed into an appropriate fuzzy or k-ary bucket such as Very High, High, Medium, Low, or Very Low, depending on a range in which its value lies. Alternatively, a continuous-valued relevance score in a specific range, such as 0 to 1, could be used.

In an embodiment of the invention, relevance scoring module 118 may utilize a mind map, based on topics and concepts present in the contextual text, to represent the online content and determine the relevance of comments to portions of the online content. For example, mind mapping software may associate topics and concepts presented in the content with progressive mind map states, labeled, for example, with a percentage of the total content, or other indicator of position in the online content.

Comment insertion module 120 operates generally to insert an informative comment received from comment classifier module 116, at a location in the online content where it is most relevant, based on relevancy information received from relevance scoring module 118. Comment insertion refers to associating a comment with a particular portion of the online content, in such a way that the viewer may retrieve the comment in conjunction with the associated portion of the online content, e.g., via a hyperlink or clickable text overlay. The received information may include a location in the contextual text where the comment is determined to be most relevant, and a relevance score for the comment relative to that location. For example, comment insertion module 120 may insert a comment in video content at a playback time or frame corresponding to a timestamp in the contextual text near the location identified by relevance scoring module 118 as most relevant.

In an embodiment of the invention, comment insertion module 120 may determine a location to insert a timed comment based on the location at which the timed comment was originally anchored, or the relevance score assigned by relevance scoring module 118, or a combination of both.

Comment selection module 122 operates generally to receive the comments inserted by comment insertion module 120, along with a location of insertion and a relevance score associated with the location of insertion, and select a subset of the inserted comments for presentation to a viewer of the online content. For example, only comments having a relevance score exceeding a predefined threshold may be selected. Comment selection module 122 may also take into account the recentness of comments and select, for example, by selecting with a higher probability the most recent ones. A subset of the inserted comments may also be selected randomly so that, for example, different sets of comments are presented in different user sessions.

In some embodiments of the invention, comment selection module 122 may select comments based, in part, on a stored or inferred profile of the current user. For example, demographic data on the user may be taken into account in selecting comments appropriate to the user. For educational content, the current knowledge state of a user may be taken into account in selecting comments. In this case, selection of comments may be done statically, or dynamically as the user's knowledge of the material increases, based, for example, on interactive tests. Current user knowledge of educational content may be represented, for example, as a mind map, with mind map states based on mastery of the material presented, as indicated by the results of interactive tests.

In various embodiments of the invention, comments may be selected by comment selection module 122 on a probabilistic basis, according to a predefined distribution. For example, the likelihood of selecting a comment may depend on factors such as the total number of comments; the relevance of the comment, e.g., based on a correlation of the comment with the content or with the knowledge state of a user; or a user profile, as described above. Comments selected may, for example, be ones that lie within a given variance from a base-level probability.

For example, assume that there are N comments, where each comment $C_i$ ($1 \leq i \leq N$) can be selected with probability $\rho_i$. If all the comments are equally likely, then $\rho_i = 1/N$. However, a comment $C_i$ may have a higher probability of being selected, based on 1) a user-dependent correlation measure $\rho_{i,1}$ based on the correlation of $C_i$ with the user profile, 2) a user-dependent correlation measure $\rho_{i,2}$ based on the correlation of $C_i$ with the current knowledge state of the user, and 3) a user-independent correlation measure $\rho_{i,3}$ based on the correlation of $C_i$ with the content, or 4) a time-dependent correlation measure $\rho_{i,4}$ based on the how recent the comment is, such as a linear function $(1-t/T)$ for the time t associated with $C_i$ relative to an overall time duration T. Then an overall correlation measure $\rho_i$ may be constructed, based on a weighted combination with weights $\alpha_{i,k}$ of the correlation measures $\rho_{i,k}$, such that $\rho_i = \Sigma_k \alpha_{i,k} \rho_{i,k}$, k=1, 2, 3, 4. If the overall correlation measures are in the ratio $\rho_1 : \rho_2 : \ldots : \rho_i : \ldots \rho_N$, then their probabilities $\rho_i$ can be obtained proportional to these correlation measures, such that $\Sigma_i \rho_i = 1$. For example, the probability for $C_j$ may be given by $p_j = \rho_j / \Sigma_j \rho_j$. Thus, the most relevant or recent comments will have a higher likelihood of being selected. Based, for example, on the space available to present comments, only a subset of comments may be selected, where the selection is based on the probabilities described above.

In an embodiment of the invention, comment selection module 122 may convert comments selected for presentation to the current user's preferred language. For example, a comment may be converted from text to an audio representation, i.e., to speech, in the user's preferred language so that users interacting with the online content may listen to the comment in their preferred language. Alternatively, comment selection module 122 may convert comments selected for presentation to video form, so that users interacting with the online content may view the comment as a video clip in their preferred language.

In certain embodiments of the invention, comment selection module 122 may, prior to users interacting with the online content, preselect a subset of the comments to be made available when users initially interact with the online content, based on predefined, user-independent criteria, such as recentness.

In other embodiments, comment selection may be performed by comment selection module 122 in real time, concurrently with user interaction with the online content, and may include comments entered by the current user. Comment selection module 122 may select for presentation comments entered by the current user either independently of relevance scores for the user's comments received from comment insertion module 120, or based, at least in part, on the relevance scores.

In various embodiments of the invention, comment selection module 122 may operate in a distributed manner, with initial selection performed remotely based on a coarse or generic user profile, for example via demographics. Additional refinement of comment selection may be done locally on the local device or server that is presenting the content, for example based on current local knowledge. Alternatively, comment selection may be performed completely remotely or completely locally.

For example, a local agent on a user device 126 may have additional or more refined information associated with the current user, whereas a remote server may not have knowledge of some user-dependent information, or may only have some coarse-level knowledge associated with the user. In this case, the measure $\rho_{i,1}$ described above may be a coarse measure based on a coarse user profile available on the remote server. For example the remote server may have access only to approximate demographics on the user. Further, the local agent on the user device 126 may have additional knowledge about the knowledge state of the user based on previous knowledge obtained by the user, relative to the knowledge state known to the remote server. In such cases, the remote server may select Q of the N comments, and subsequently, the local agent may further refine the selection based on a local correlation metrics $\psi_{i,1}$ associated with a more refined local user profile and/or a local correlation metric $\psi_{i,2}$ based on the more refined local knowledge state associated with the user. Then an overall correlation measure $\psi_i$ may be obtained based on a weighted combination, with weights $\beta_{i,k}$, of the correlation measures such that $\psi_i = \Sigma_k \beta_{i,k} \psi_{i,k}$, where k=1, 2. If the overall correlation measures of the Q prior selected comments are in the ratio $\psi_1 : \psi_2 : \ldots : \psi_i : \ldots : \psi_Q$, then their probabilities $r_i$ can be obtained proportional to these correlation measures such that $\Sigma_i \psi_i = 1$. For example, the probability $r_j$ for selecting a comment $C_j$ is given by $r_j = \psi_j / \Sigma_i \psi_i$, and additional selection of the comments may be performed based on such probabilities, to make a final selection of comments to be presented to the user. The final selection of comments can be based on the amount of space available to present comments to the user.

Figure 3:
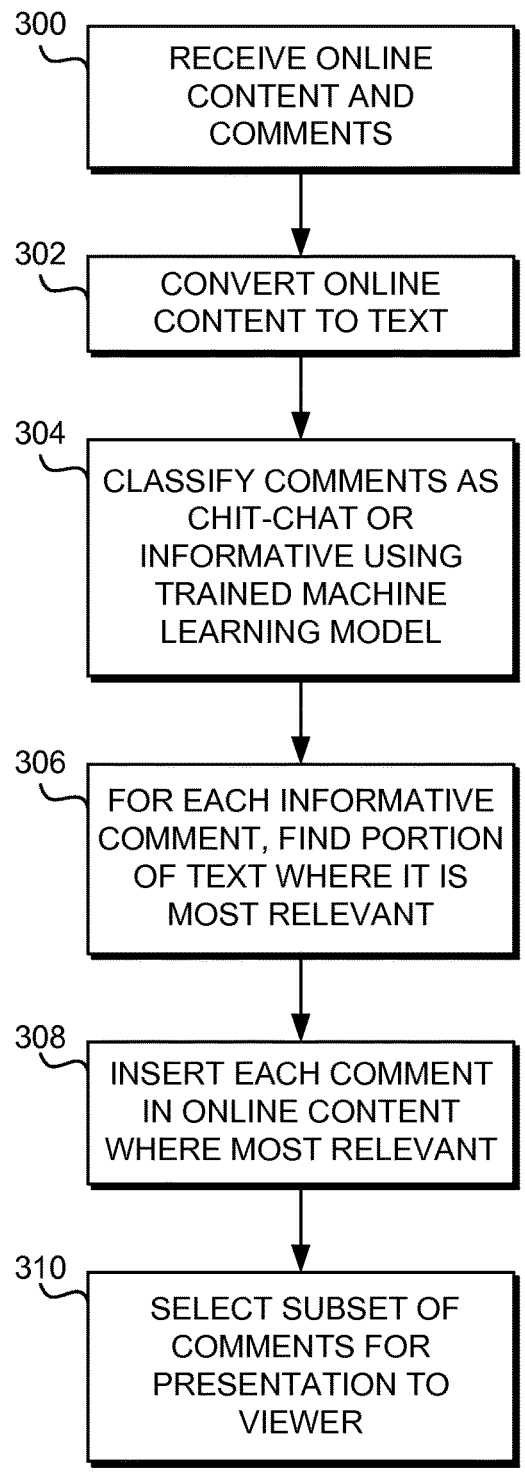
FIG. 3 is a flowchart depicting operational steps of a CRCA program, in accordance with an embodiment of the present invention.

FIG. 3 is a flowchart depicting operational steps of CRCA program 112, in accordance with an exemplary embodiment of the invention. CRCA program 112 may receive online content, such as a video or audio recording (step 300). Content processor module 114 may convert the speech in the online content to a textual representation, the contextual text (step 302). Comment classifier module 116 may classify a comment as either chit-chat or informative (step 304). Relevance scoring module 118 may determine a portion of the contextual text to which the comment is most relevant (step 306). Comment insertion module 120 may insert the comment in the online content at a position corresponding to the most relevant portion of the contextual text (step 308). Comment selection module 122 may select a subset of the inserted comments to present to a user (step 310).

FIG. 4 depicts a block diagram 900 of components of client computing devices 126 and/or server 110 (FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Client computing devices 126 and/or server 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, CRCA program 112 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computing devices 126 and/or server 110 may also include a R/W drive or interface 914 to read from and write to one or more portable computer readable storage media 926. Application programs 928 on client computing devices and/or server 110 may be stored on one or more of the portable computer readable storage media 926, read via the respective R/W drive or interface 914 and loaded into the respective computer readable storage media 908.

Client computing devices 126 and/or server 110 may also include a network adapter or interface 916, such as a TCP/IP adapter card or wireless communication adapter (such as a 4G wireless communication adapter using OFDMA technology). Application programs 928 on client computing devices 126 and/or server 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Client computing devices 126 and/or server 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
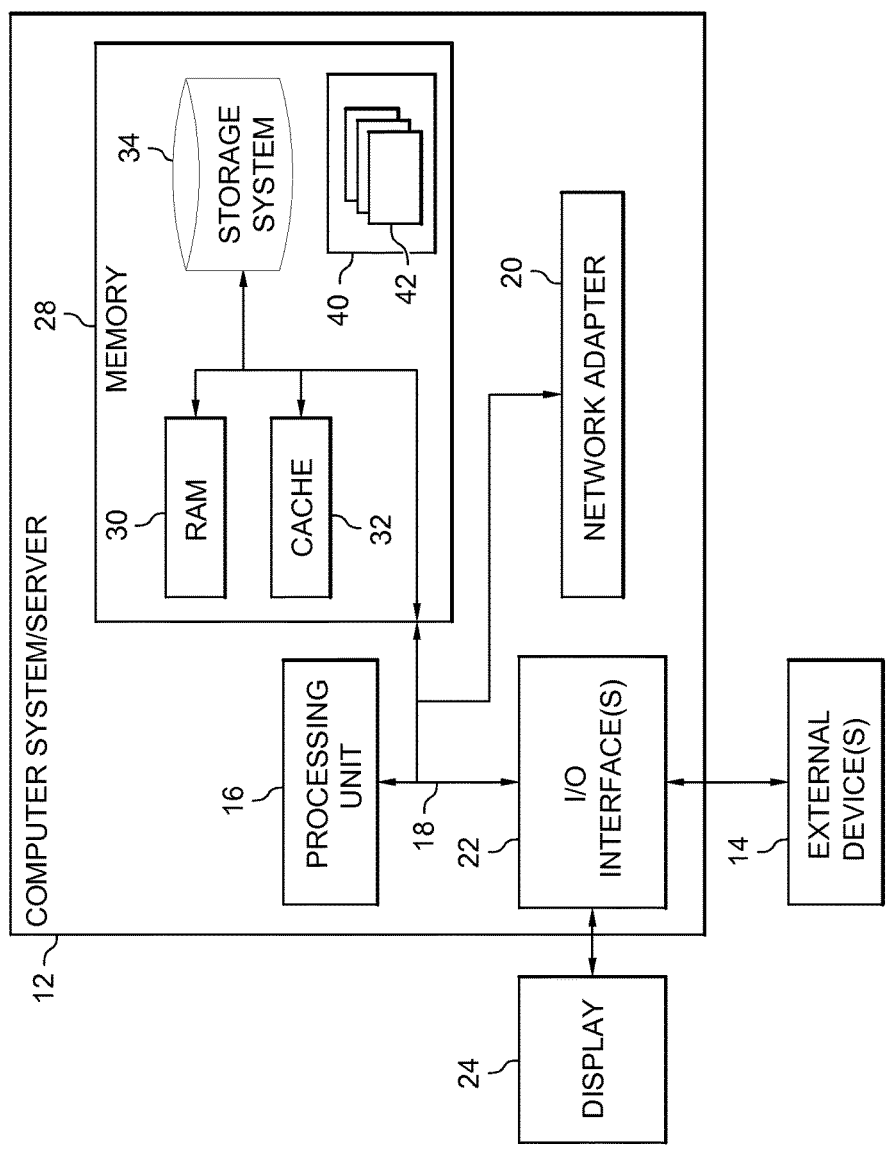
FIG. 5 is a functional block diagram of a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
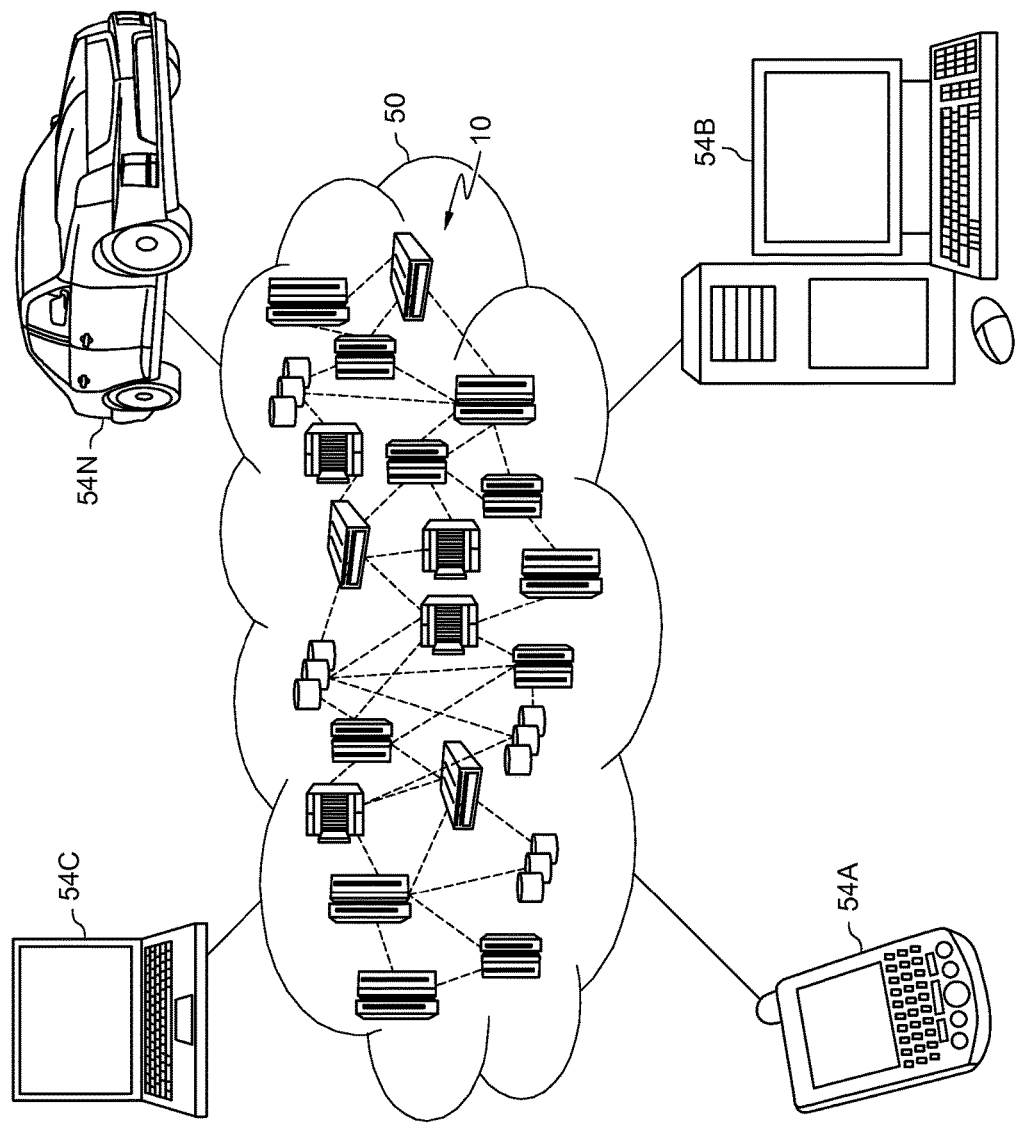
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
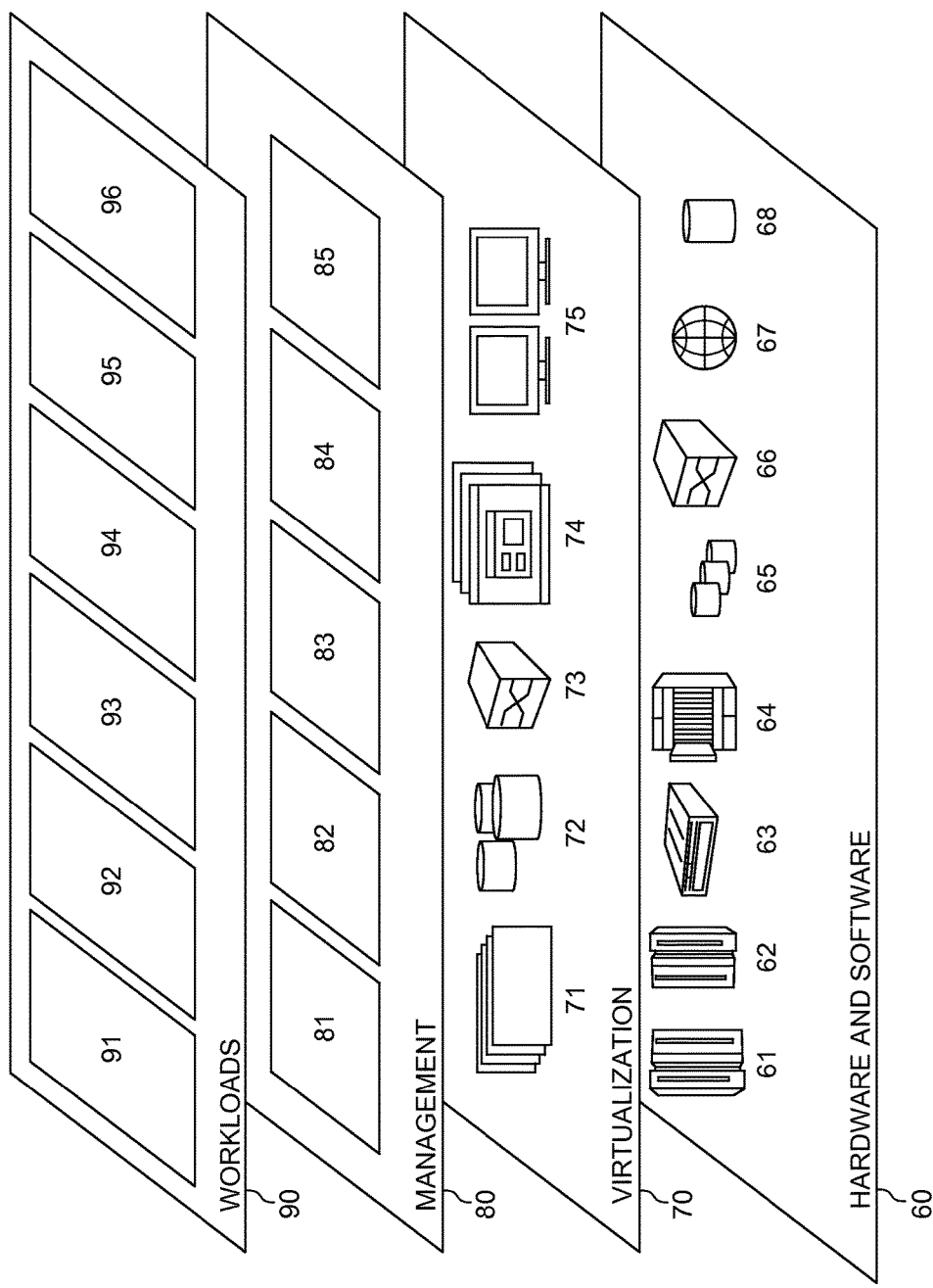
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CRCA program 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer-implemented method for automatically augmenting online content with contextually relevant comments, the method comprising:
  receiving, by a computer from a network server that hosts an online content provider, online content from the online content provider;
  receiving, by the computer from the online content provider, user-entered comments associated with the online content:
  classifying the comments, by a trained machine learning model on the computer, as either chit-chat if the comment corresponds to training data characterized as meaningless, unhelpful, or unimportant, or informative if the comment corresponds to training data characterized as containing valuable information:
  for each comment classified as informative:
  determining, by the computer, a portion of the online content to which the comment is most relevant, wherein the determining further comprises:
  converting the online content data to text;
  assigning, by the computer, scores to segments of the text indicating a relevance of the comment to each segment, and identifying a segment with the highest score; and
  associating, by the computer, the comment with a position in the online content that corresponds to the determined portion of the online content;
  selecting, by the computer, a subset of the informative comments for presentation, based on a predefined criteria, wherein the predefined criteria comprises a selection based on one or more of informative comments having a score exceeding a predefined threshold, recentness, randomness, a known or inferred profile of a user, a probabilistic basis according to a predefined distribution, or in real time, concurrently with user interaction with the online content;
  converting the selected subset of the informative commands from text to a format suitable for presentation with the online content data; and
  annotating, by the computer, the online content with the selected subset of informative comments at the positions in the online content associated with respective comments in the subset of informative comments.

2. A method in accordance with claim 1, wherein the online content is audio or video data, and the method further comprises:
  converting, by the computer, speech in the online content to text; and wherein determining comprises determining, by the computer, a portion of the text to which the comment is most relevant.

3. A method in accordance with claim 2, wherein determining a portion of the text to which the comment is most relevant comprises assigning, by the computer, scores to segments of the text indicating a relevance of the comment to each segment, and identifying a segment with the highest score.

4. A method in accordance with claim 3, wherein assigning, by the computer, scores to segments of the text indicating a relevance of the comment to each segment, comprises applying natural language processing techniques to identify semantically related words and phrases appearing in the comment and the segment, respectively.

5. A method in accordance with claim 2, wherein topics and concepts in the text are represented in the form of a mind map.

6. A method in accordance with claim 1, further comprising converting, by the computer, informative comments selected for presentation to a user's preferred language in text, audio, or video form.

7. A computer program product for automatically augmenting online content with contextually relevant comments, the computer program product comprising:
one or more computer-readable non-transitory storage media and program instructions stored on the one or more non-transitory computer-readable storage media, the program instructions comprising:
program instructions to receive from a network server that hosts an online content provider, online content from the online content provider;
program instructions to receive from the online content provider, user-entered comments associated with the online content;
program instructions to classify the comments a trained machine learning model as either chit-chat if the comment corresponds to training data characterized as meaningless, unhelpful, or unimportant, or informative if the comment corresponds to training data characterized as containing valuable information;
for each comment classified as informative, program instructions to:
determine a portion of the online content to which the comment is most relevant, wherein the program instructions further comprise program instructions to:
convert the online content data to text;
assign scores to segments of the text indicating a relevance of the comment to each segment, and identify a segment with the highest score; and
associate the comment with a position in the online content that corresponds to the determined portion of the online content;
program instruction to select a subset of the informative comments for presentation based on a predefined criteria, wherein the predefined criteria comprises a selection based on: one or more of informative comments having a score exceeding a predefined threshold, recentness, randomness, a known or inferred profile of a user, a probabilistic basis according to a predefined distribution, or in real time, concurrently with user interaction with the online content;
program instructions to convert the selected subset of the informative commands from text to a format suitable for presentation with the online content data; and
program instructions to annotate the online content with the selected subset of informative comments at the positions in the online content associated with respective comments in the subset of informative comments.

8. A computer program product in accordance with claim 7, wherein the online content is audio or video data, further comprising:
program instructions to convert speech in the online content to text; and wherein program instructions to determine comprise program instructions to determine a portion of the text to which the comment is most relevant.

9. A computer program product in accordance with claim 8, wherein program instructions to determine a portion of the text to which the comment is most relevant comprise program instructions to assign scores to segments of the text indicating a relevance of the comment to each segment, and program instructions to identify a segment with the highest score.

10. A computer program product in accordance with claim 9, wherein program instructions to assign scores to segments of the text indicating a relevance of the comment to each segment comprise program instructions to apply natural language processing techniques to identify semantically related words and phrases appearing in the comment and the segment, respectively.

11. A computer program product in accordance with claim 8, wherein topics and concepts in the text are represented in the form of a mind map.

12. A computer program product in accordance with claim 7, further comprising program instructions to convert informative comments selected for presentation to a user's preferred language in text, audio, or video form.

13. A computer system for automatically augmenting online content with contextually relevant comments, the computer system comprising:
one or more computer processors, one or more computer-readable storage media devices, and program instructions stored on one or more of the computer-readable storage media devices for execution by at least one of the one or more processors, the program instructions comprising:
program instructions to receive from a network server that hosts an online content provider, online content from the online content provider;
program instructions to receive from the online content provider, user-entered comments associated with the online content;
program instructions to classify the comments a trained machine learning model as either chit-chat if the comment corresponds to training data characterized as meaningless, unhelpful, or unimportant, or informative if the comment corresponds to training data characterized as containing valuable information;
for each comment classified as informative, program instructions to:
determine a portion of the online content to which the comment is most relevant, wherein the program instructions further comprise program instructions to:
convert the online content data to text;
assign, by the computer, scores to segments of the text indicating a relevance of the comment to each segment, and identifying a segment with the highest score; and
associate the comment with a position in the online content that corresponds to the determined portion of the online content;
program instruction to select a subset of the informative comments for presentation based on a predefined criteria, wherein the predefined criteria comprises a selection based on one or more of: informative comments having a score exceeding a predefined threshold, recentness, randomness, a known or inferred profile of a user, a probabilistic basis according to a predefined distribution, or in real time, concurrently with user interaction with the online content;
program instructions to convert the selected subset of the informative commands from text to a format suitable for presentation with the online content data; and program instructions to annotate the online content with the selected subset of informative comments at the positions in the online content associated with respective comments in the subset of informative comments.

14. A computer program product in accordance with claim 13, wherein the online content is audio or video data, further comprising:
program instructions to convert speech in the online content to text; and wherein program instructions to determine comprise program instructions to determine a portion of the text to which the comment is most relevant.

15. A computer program product in accordance with claim 14, wherein program instructions to determine a portion of the text to which the comment is most relevant comprise program instructions to assign scores to segments of the text indicating a relevance of the comment to each segment, and program instructions to identify a segment with the highest score.

16. A computer program product in accordance with claim 15, wherein program instructions to assign scores to segments of the text indicating a relevance of the comment to each segment comprise program instructions to apply natural language processing techniques to identify semantically related words and phrases appearing in the comment and the segment, respectively.

17. A computer program product in accordance with claim 13, further comprising program instructions to convert informative comments selected for presentation to a user's preferred language in text, audio, or video form.

* * * * *